United States Patent [19]

Iverson

[11] 4,385,640
[45] May 31, 1983

[54] HYDRAULIC UNLOADER

[75] Inventor: Jacob E. Iverson, Pompano Beach, Fla.

[73] Assignees: Thomas D. McKane, Lauderdale-by-the-Sea, Fla.; John H. Burt, Atlanta, Ga.; part interest to each

[21] Appl. No.: 262,825

[22] Filed: May 12, 1981

Related U.S. Application Data

[63] Continuation-in-part of Ser. No. 181.127, Aug. 25, 1980, abandoned.

[51] Int. Cl.$^3$ .............................................. G05D 7/01
[52] U.S. Cl. .................................. 137/117; 239/127; 417/299
[58] Field of Search ................ 137/117; 239/126, 127; 417/299

[56] References Cited

U.S. PATENT DOCUMENTS

| | | | |
|---|---|---|---|
| 1,934,758 | 11/1933 | Temple | 137/117 X |
| 2,022,481 | 11/1935 | Schellenger | 239/127 X |
| 2,692,798 | 10/1954 | Hicks | 239/127 X |
| 3,147,922 | 9/1964 | Warner | 239/127 |
| 3,976,090 | 8/1976 | Johnson | 137/117 |
| 4,182,354 | 1/1980 | Bergstedt | 137/117 X |
| 4,243,064 | 1/1981 | Nolte | 137/117 |

FOREIGN PATENT DOCUMENTS 626499 7/1949 United Kingdom ............... 417/299

*Primary Examiner*—Robert G. Nilson
*Attorney, Agent, or Firm*—Wood, Dalton, Phillips, Mason & Rowe

[57] ABSTRACT

An unloader for a high pressure hydraulic system, as a high pressure spraying system, has a pressure inlet for connection with a pump, a pressure outlet for connection with a load and a bypass outlet with a bypass valve. A piston moves the bypass valve between open and closed positions. The flow of liquid through the unloader from the inlet to the pressure outlet and to the hydraulic load establishes a pressure differential across the piston to close the bypass valve. When no flow to the load occurs, there is no differential pressure across the piston and the bypass valve is opened.

5 Claims, 11 Drawing Figures

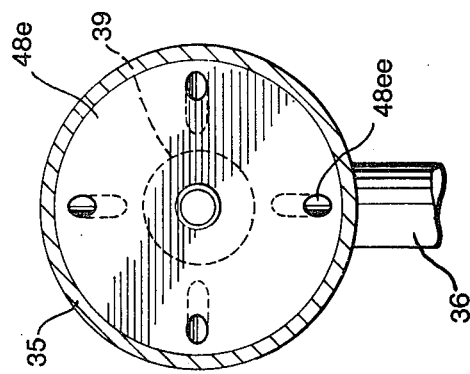
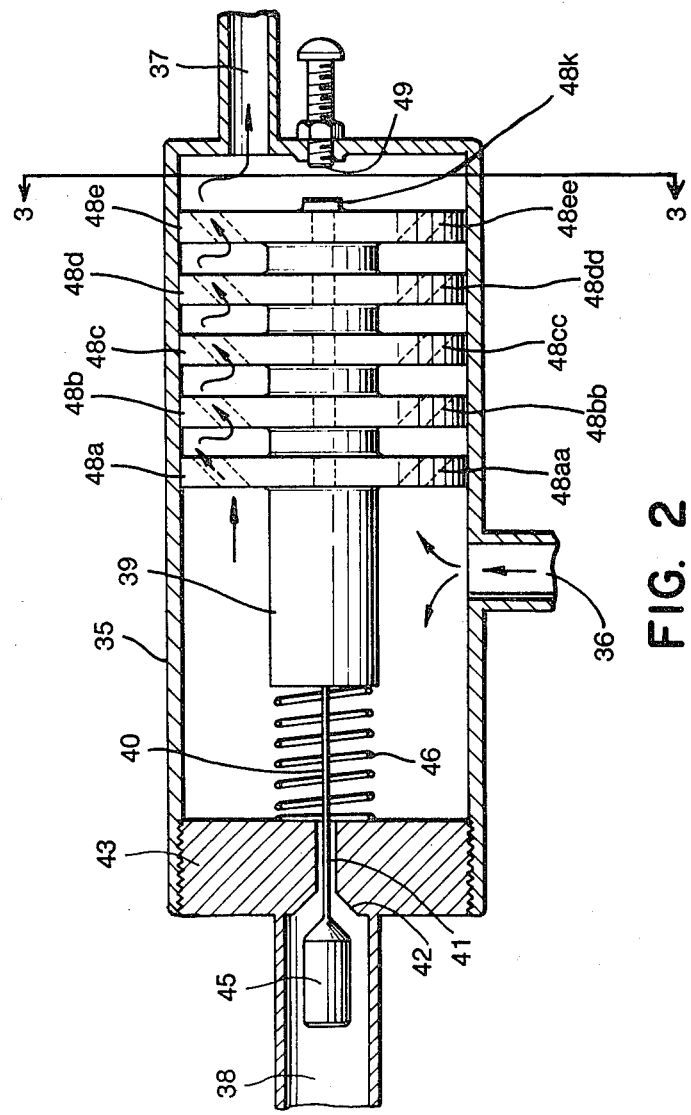
FIG. 3
FIG. 2

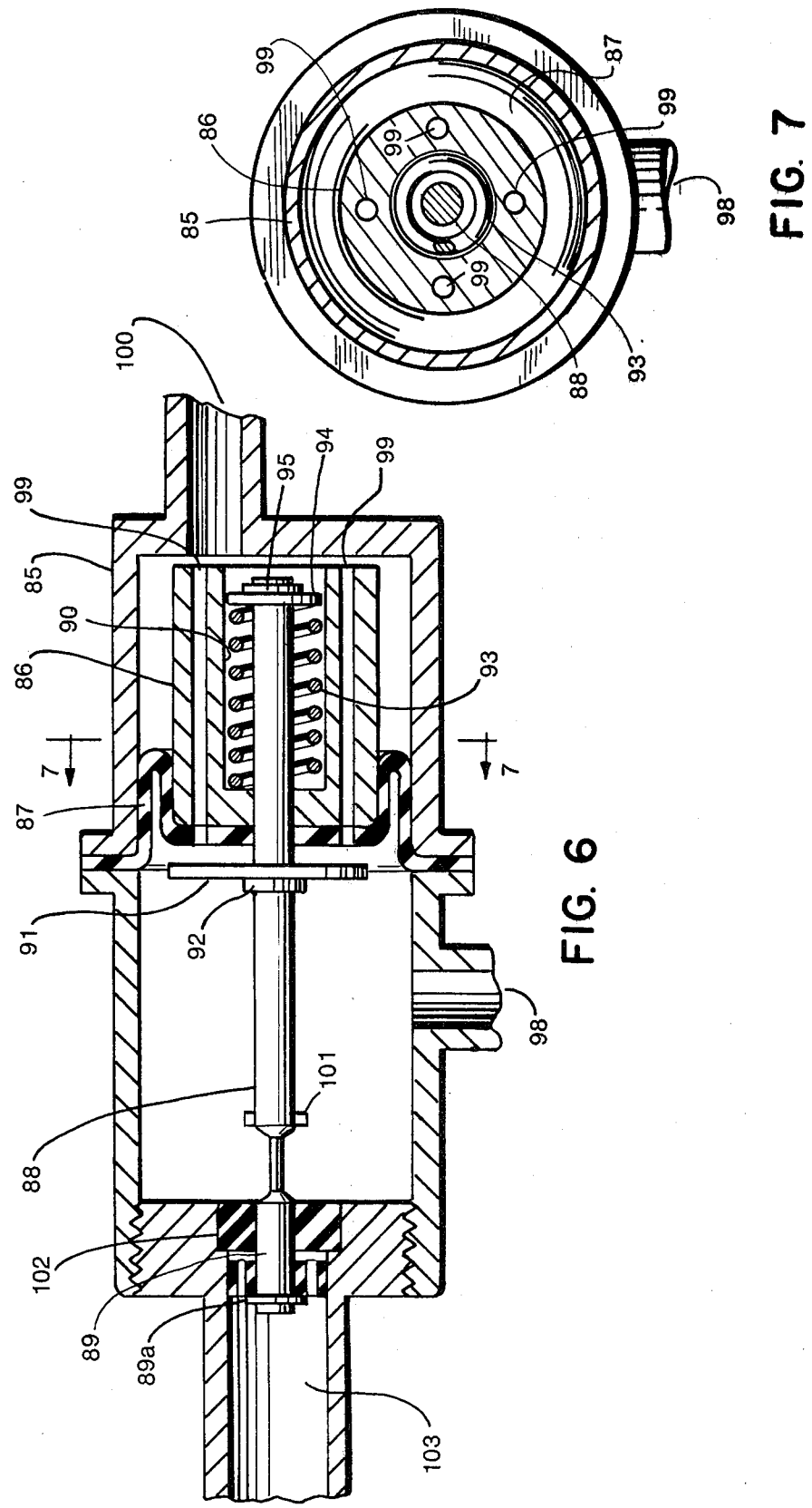

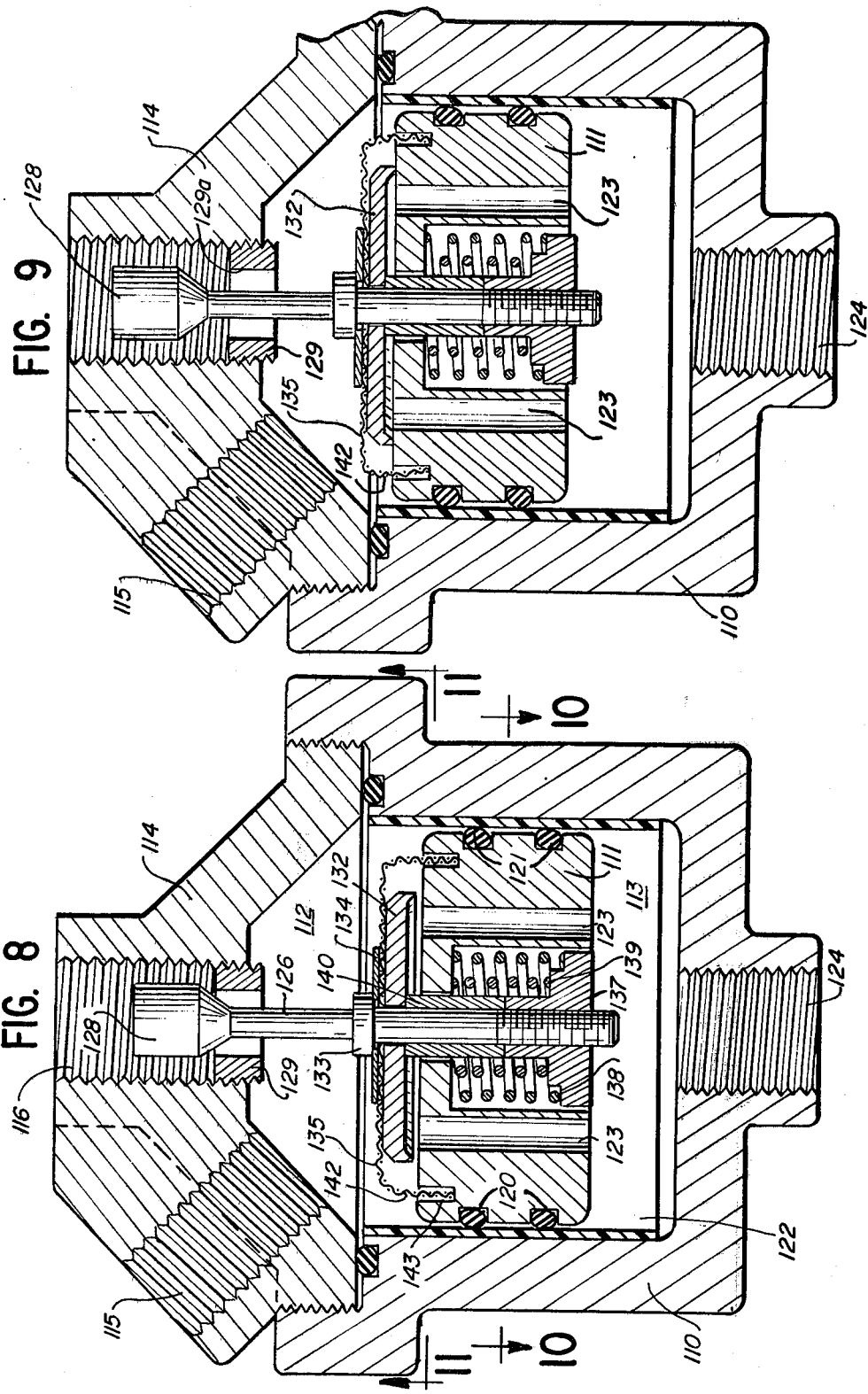

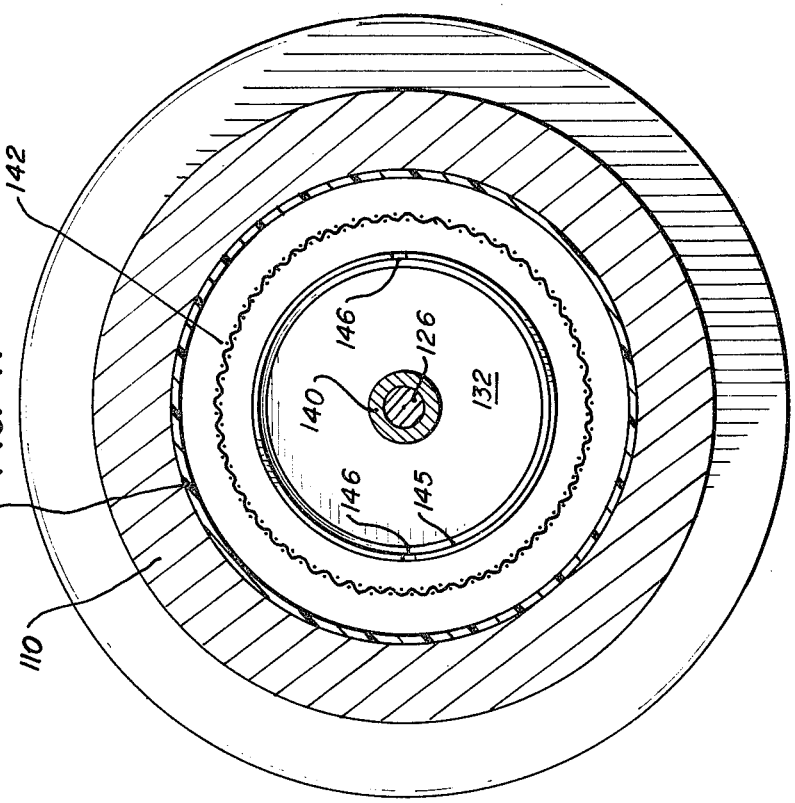
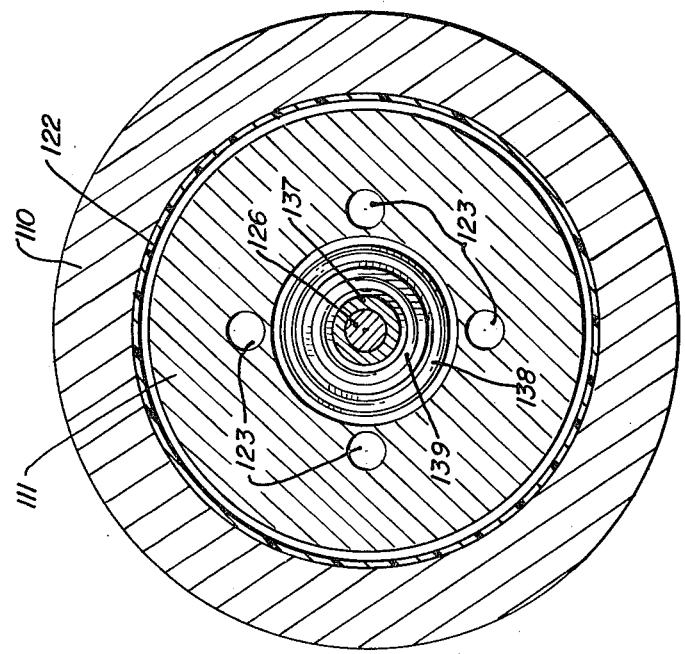

HYDRAULIC UNLOADER

This application is a continuation-in-part of my application Ser. No. 181,127, filed Aug. 25, 1980, and now abandoned.

This invention relates to an unloader for a hydraulic system to relieve the pressure when flow to the load is reduced. The unloader is particularly suited for use in a high pressure spraying system operating at 1000 PSI and higher but is also usable at lower pressure and in order hydraulic systems, as for hydraulic controls and actuators.

Typical prior art unloaders have one or more valves with bias springs to resist the fluid pressures involved. At high pressure, the springs are heavy and stiff. The springs require repeated adjustment and frequent replacement.

A principal feature of the invention is that the unloader includes a bypass valve with an operator which is responsive to a pressure differential established by the flow of hydraulic liquid from the pump to the hydraulic load.

In the preferred embodiment of the unloader, the hydraulic liquid flows from the inlet to the pressure outlet through a passage in a piston which is connected with and operates the bypass valve. The piston passage defined in part by a spring loaded element with the spring force providing a measure of control over the differential pressure developed to close the bypass valve.

More particularly, the unloader has a housing defining a cylinder, a piston movable in the cylinder and dividing it into a pressure inlet chamber for connection with the pump and the bypass outlet, and an outlet chamber with the pressure outlet for connection with the hydraulic load. A piston rod extends from the piston to the bypass outlet and has the bypass valve at the end thereof. Flow of liquid through the piston to the pressure load establishes a differential pressure across the piston, closing the bypass. In the absence of such flow, the pressure acting on the piston opens the bypass.

A further feature is that a gate valve is fixed to the piston rod between the piston and the bypass valve and that the piston is movable on the rod with a spring urging the piston against the gate valve to close the passage through the piston. A slot in the gate valve allows leakage of liquid through the valve and piston when the gate valve is seated.

Another feature is an uploader system in which a second hydraulic load is connected with the bypass outlet.

Further features and advantages of the invention will readily be apparent from the following specification and from the drawings, in which:

FIG. 2 is a longitudinal section of one embodiment of the unloader;

FIG. 3 is a transverse section taken along line 3—3 of FIG. 2;

FIG. 6 is a longitudinal section of a third embodiment of the unloader;

FIG. 7 is a transverse section taken along line 7—7 of FIG. 6;

FIG. 8 is a longitudinal section through the preferred embodiment of the unloader with the bypass valve closed;

FIG. 9 is a view similar to FIG. 8 with the bypass valve open;

FIG. 10 is a transverse section taken along line 10—10 of FIG. 8; and

FIG. 11 is a transverse section taken along line 11—11 of FIG. 8.

The unloader is illustrated and described as incorporated in a high pressure water spraying system. It may be used in other hydraulic systems with water or other liquids as, for example, in hydraulic control or actuation systems using an oil.

Figure 1:
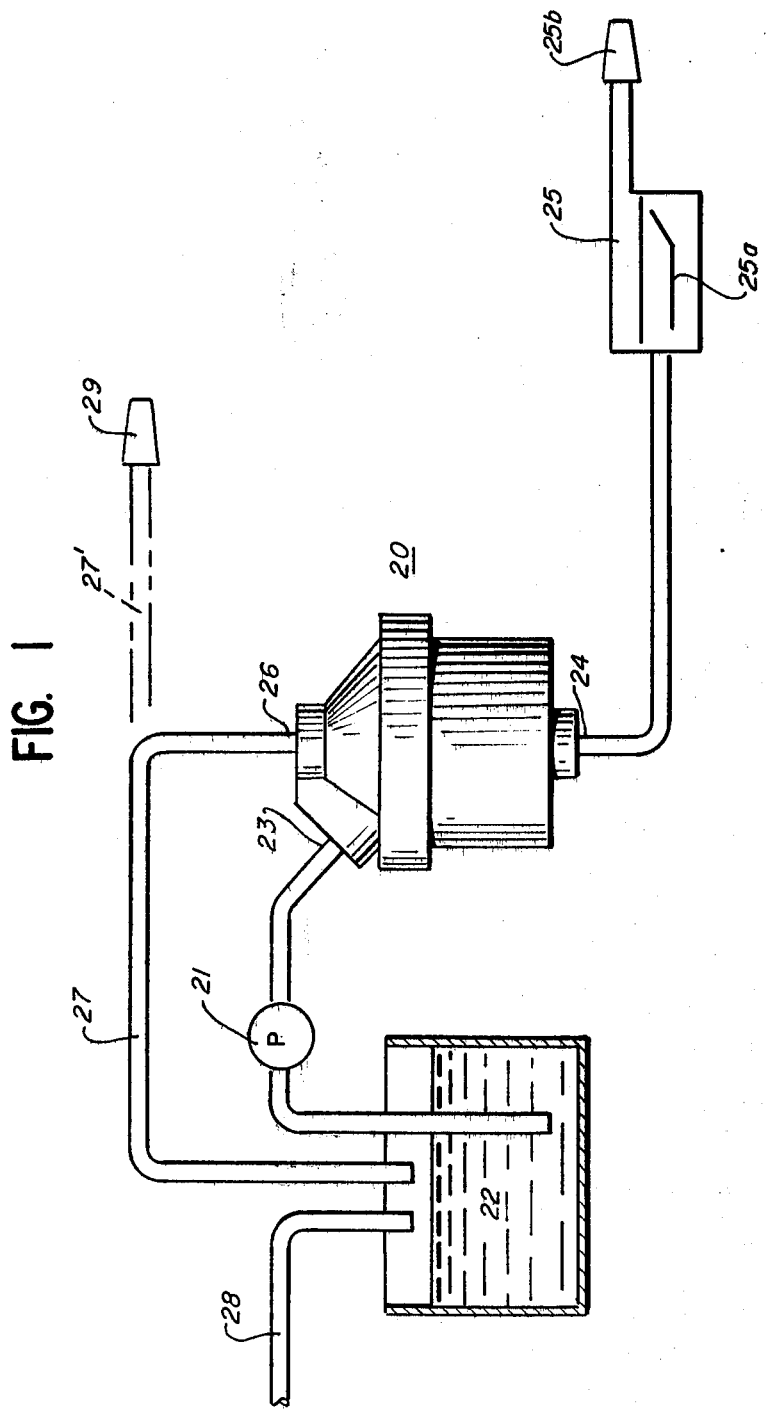
FIG. 1 is a diagrammatic illustration of a hydraulic system for operating the unloader of the invention.

In FIG. 1 a high pressure water spraying system is shown with a hydraulic unloader 20. Pump 21, which may be a positive displacement piston pump, has an intake connected with a water reservoir 22 and an outlet connected with the pressure inlet 23 of the unloader. The pressure outlet 24 of the unloader is connected with a sprayer 25 having an on-off trigger 25a and a nozzle 25b. The orifice of the nozzle is correlated with the pump capacity for the desired pressure and flow rate. The bypass outlet 26 of the unloader is connected through a conduit 27 to return bypass water to the water reservoir 22. Makeup water is provided from a supply through conduit 28 and a suitable level control (not shown) may be used.

The bypass outlet 26 may alternatively be connected with a secondary load as nozzle 29 through the conduit 27' indicated in broken lines. For example, if the unloader is used in a high pressure painting system, the nozzle 29 might be located in the paint supply to provide agitation during the periods when the spray gun is not operated. The orifice in the nozzle 29 would typically be much larger than that in nozzle 25b so that the velocity of the paint discharged therethrough is lower than that utilized in the painting operation. This operation may be termed "uploading" rather than unloading.

Several forms of the unloader are shown and described herein to illustrate the invention. Referring further to FIGS. 2 and 3, a cylinder 35 has an inlet port 36 for connection with the pump and a pressure outlet 37 for connection with the hydraulic load. Bypass outlet 38 relieves excess water flow and pressure. Piston 39 is connected to a piston rod 40 which extends through a channel 41 and conical valve seat 42 formed in end block 43 and terminates in a bypass valve 45. Valve 45 has a conical end surface engageable with valve seat 42. A tension spring 46 is connected between block 43 and piston 39, retracting piston 12 and opening the bypass valve in the absence of water flow through the unloader to the hydraulic load.

Piston 12 has a plurality of axially spaced parallel vanes 48a–48e which extend to and substantially abut the interior wall of cylinder 35, but have sufficient clearance that the piston is longitudinally movable in the cylinder. Each vane has four radially inclined or angularly directed orifices 48aa–48ee. As a result of the radial inclination of the orifices 48aa–48ee, the flow of water through the piston from inlet 36 to pressure outlet 37 follows a circuitous path.

In the absence of pressure from the pump, bypass valve 45 is opened by spring 46. When the pump is started and if the valve at the sprayer or other hydraulic load is open, water flows from inlet 36 through the orifices 48aa–48ee in the piston vanes to pressure outlet 37. As a result of the circuitous flow path through the piston, there is a pressure drop so that the pressure acting on the left face of the piston in FIG. 2 is greater than the pressure acting on the right face. The difference in areas on which the pressure acts, represented by the area of piston rod 40, is small so that the force tending to close the bypass valve 45 is greater than the force tending to open the bypass valve. The valve is seated and the pressurized water flows to the hydraulic load so long as it operates. A stop surface 48k on the right face of the piston engages an adjustable stop 49 to limit movement of the piston to the right when the bypass valve 45 is closed. When the trigger of the spraying apparatus is released, flow of water through the piston ceases and the pressure applied to both faces of the piston is equal. The area of the right face of the piston is greater than the area of the left by virtue of the area of piston rod 40 and the pressure is also applied through channel 18 against the face of bypass valve 45. The net force acting on the piston and valve tends to open the bypass valve and is aided by the action of spring 46. The water is returned through the bypass conduit to the reservoir 22, and the load on pump 21 is minimized.

Figure 5:
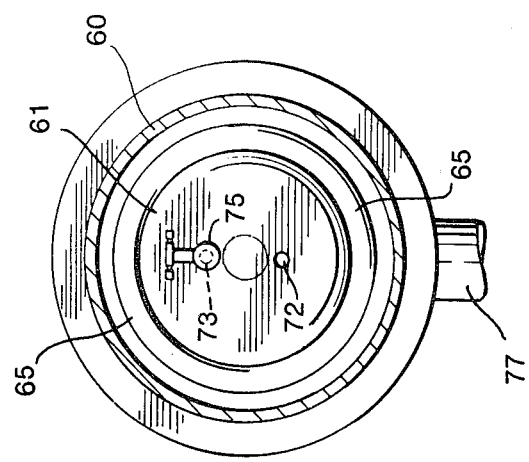
FIG. 5 is a transverse section taken along line 5—5 of FIG. 4.
Figure 4:
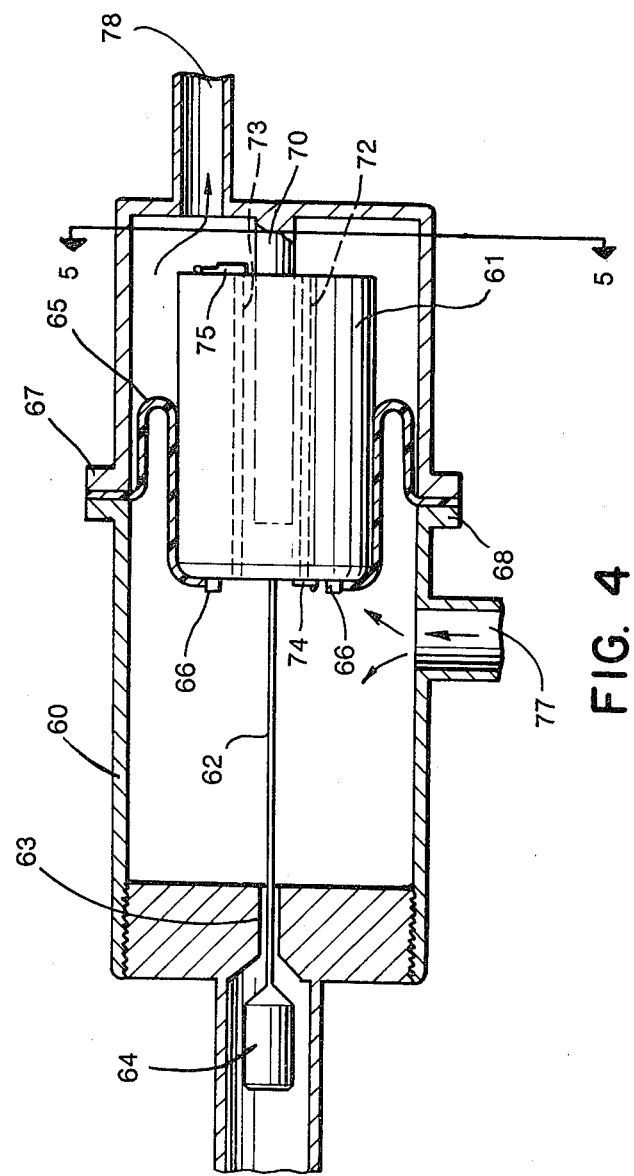
FIG. 4 is a longitudinal section of a second embodiment of the unloader.

The embodiment of the unloader illustrated in FIGS. 4 and 5 has a cylinder 60 with piston 61 connected to rod 62 which extends through channel 63 and has bypass valve 64 at the end thereof. Piston 61 is sealed with a piston wall by a rolling diaphragm 65 suitably secured to the left face of the piston as by an adhesive or a clamp at 66 and with its outer periphery secured between the flanges 67, 68 of cylinder 60.

A post 70 extends to the left from the right hand wall of cylinder 60 into an axial recess in piston 61, guiding movement of the piston and bypass valve 64. The end of post 70 engages the inner face of the recess of the piston to limit piston and valve movement toward the right. Axial passages 72, 73 extend through the piston. The passage 72 has a plug 74 at the left end thereof with an orifice which contributes to the establishment of the differential pressure as liquid flows through the piston. A spring loaded flapper 75 at right hand end of passage 73 is normally closed, but will open to allow flow therethrough if the pressure differential across the piston becomes excessive.

The operation of the unloader of FIGS. 4 and 5 is analogous to that described above for the unloader of FIG. 3. The flow of hydraulic liquid from inlet 77 to pressure outlet 78 passes through the orifice in plug 74 and passage 72, establishing a pressure differential so that the force acting to move the piston 61 to the right is greater than the force acting to move it to the left. Thus the bypass valve is seated. When the trigger on the sprayer is released, pressure to the right of piston 61 rises and the force tending to move the piston to the left is greater than that tending to move it to the right. Accordingly, the bypass valve opens.

A third form of the unloader is illustrated in FIGS. 6 and 7. Cylinder 85 has a piston 86 therein sealed with a cylinder wall by a rolling diaphragm 87. Piston rod 88 has bypass valve 89 at the left end thereof and extends through the left end of the piston 86 into cavity 90 within the piston. A piston seal or gate valve 91 is held in position on piston rod 88 by a retaining clip 92. Spring 93 around the piston rod within piston cavity 90 acts between a retaining washer 94 held by a clip 95 and the inner wall of the piston to urge the piston against piston seal 91.

FIG. 6 shows the unloader with bypass valve 89 closed for flow of water from the inlet 98 through axial passages 99 in the piston to pressure outlet 100. The action of the water flowing through the unloader separates the piston 86 from piston seal 91 against the action of spring 93 establishing a pressure differential across the piston. The force resulting from the pressure differential seats the bypass vlave 89. Collar 89a at the left end of bypass valve member 89 limits movement of the piston rod 88 toward the right. When the flow through the unloader ceases, there is no pressure drop across the piston and the force acting on the right side of the piston moves the piston against seal 91 and moves piston rod 88 and the bypass valve 89 to the left opening the bypass. Pin 101 extending transversely of piston rod 88 engages the inner surface of valve seat 102, limiting the leftward movement of the piston and rod. The liquid flows from inlet 98 out through the passages in valve seat 102 to the bypass connection 103.

The preferred construction for the unloader is shown in FIGS. 8–11. A housing has a cup-shaped main body 110 which forms a cylinder for piston 111. The piston divides the housing into an inlet chamber 112 and an outlet chamber 113. The housing is closed by a dome-shaped cap 114 threaded to main body 110 with the joint sealed by an O-ring 115. The two parts of the housing are preferably of zinc castings. Piston 111 is preferably of brass. Inlet 115 for connection with a pump is formed in the side wall of cap 114. Bypass outlet 116 is located on the axis of the housing at the end of the cap.

Piston 111 has peripheral grooves in which O-rings 121 are seated to seal with a Teflon cylinder liner 122. Axial passages 123 through the piston provide for flow of liquid from inlet 115 to pressure outlet 124. Piston rod 126, as in FIG. 6, extends at one end through the piston 123 into a piston cavity 127, and at the other end is formed with the bypass valve 128 which engages a valve seat 129 in the bypass outlet 116. Piston rod 126, bypass valve 128 and valve seat 129 are preferably of stainless steel.

A piston seal or gate valve 132 is mounted on piston rod 126 and is seated against a shoulder 133 with a washer 134 and a cup-shaped stainless steel screen 135 interposed therebetween. The end of piston rod 126 within piston cavity 127 is threaded and has a spring cap 137 thereon which supports springs 138, 139 that bear against the inner wall of the piston cavity and urge the piston against gate valve 132. A spacer 140 surrounds the piston rod 126 and extends through piston 111 to engage the undersurface of gate valve 132. The spring pressure acting on piston 111 is established by the length of spacer 140.

Cup-shaped screen 135 overlying gate valve 132 has its peripheral edge 142 received in a groove 143 in the face of piston 111 outside the periphery of gate valve 132 and the axial piston passages 123. The depth of groove 143 is greater than the maximum separation of the piston 111 and gate valve 132 so that the edge of the screen always remains in the groove and all liquid flow is through the screen. With the gate valve seated on the piston 111, FIG. 9, the screen 135 engages the bottom of the slot 143 and the peripheral edge 142 is slightly bowed.

Piston 111 is free to move axially in cylindrical housing 110 without restraint, in the absence of pressure on the liquid in the system. When the pump operates and if the valve at the load connected with pressure outlet 124 is open, water flows through the unloader and piston passages 123 to the load. The pressure and flow conditions cause the piston to move away from gate valve 132 against the action of springs 138, 139 establishing a pressure differential between the inlet chamber 112 and the outlet chamber 113. The higher pressure existing in inlet chamber 112 causes the piston to move toward pressure outlet 124, seating bypass valve 128 on the valve seat 129. Any foreign matter in the liquid is trapped on screen 135 and does not reach the high pressure nozzle.

When liquid flow to the high pressure load ceases, the pressure differential across piston 111 no longer exists and the pressure acting on the undersurface of piston 111 and on bypass valve 128 developes a force tending to open the bypass which is greater than the force acting on the upper surface of piston 111 tending to close the bypass. The piston moves upwardly as shown in FIG. 9, opening the bypass and relieving the pressure in inlet chamber 112. Liquid under pressure in outlet chamber 113 and in the hydraulic system will flow back through the piston and screen 135 dislodging particulate matter which may have deposited thereon. The particulate matter is carried away by the liquid flow through the bypass outlet.

Disc-shaped gate valve 132 has a peripheral edge 145 which seats on the upper face of piston 111. Slots 146, FIG. 11, in the pierpheral edge 145, allow leakage of liquid between the chambers when the gate valve is seated. This provides smooth operation of the gate valve and avoids pressure surges or impact loads which sometimes occur with systems using other types of unloaders.

In the event of a system malfunction which causes an excessive pressure condition, as from particl blockage of the nozzle 25b or from use of a pump 21 which has excessive capacity for the nozzle 25b, the unloader will cycle through a bypass operation and then again recharge the hydraulic load. This occurs because the flow through the piston passage 123 is insufficient to establish the desired pressure differential and the bypass valve is opened. Water leaks off to reduce the pressure and the pressure differential is reestablished. The bypass opens and closes repeatedly maintaining pressure in the system at a safe level.

The pressure at which safety release will occur is affected by several factors in the construction of the unloader. One is the pressure exerted on piston 111 by springs 138, 139. For a higher level of operating and overpressure, a higher spring pressure is needed and a shorter spacer 140 is used. Another factor is the area of the bypass valve 128 which is exposed to the pressure in inlet chamber 112. To achieve a higher unloading pressure, the port 129a through valve seat 129 is reduced in diameter. Valve seat 129 is threaded into bypass connection 116 so that the appropriate valve seat may readily be utilized at the time the unloader is assembled.

The unloader described above is not dependent for its operation on spring biased valves which respond to the absolute hydraulic pressure. Rather, use is made of the differential pressure developed within the system by liquid flow, providing reliable operation without the heavy, stiff springs used by the prior art. Periodic adjustment and replacement of components are unnecessary.

I claim:

1. A hydraulic pressure unloader for connection between a pump and a hydraulic load, said unloader comprising:
   a housing defining a cylinder;
   a piston movable in said cylinder and dividing the cylinder into two chambers, an inlet chamber having a pressure inlet for connection with said pump and a bypass outlet, and an outlet chamber having a pressure outlet for connection with said hydraulic load, said piston having a passage therethrough for flow of hydraulic liquid from the inlet to the pressure outlet;
   a piston rod extending from said piston through said bypass outlet, having a bypass valve at the end thereof, movement of said piston toward the bypass outlet opening the bypass valve and movement of the piston away from the bypass outlet closing the bypass valve, the flow of liquid through the piston from the inlet to the pressure outlet establishing a pressure differential across the piston to close the bypass valve, the pressure in the outlet chamber acting on a larger piston surface than does the pressure in the inlet chamber, whereby when the pressures in the two chambers are the same, the bypass valve is opened;
   a gate valve on the piston rod between the piston and the bypass valve, the piston being movable on the rod toward and away from said gate valve;
   a spring urging the piston against the gate valve to close the flow passage to the piston, liquid flow from the inlet to the pressure outlet moving the piston away from the gate valve against the spring to establish the differential pressure between the inlet and outlet chambers;
   a threaded nut at the end of the piston rod remote from the bypass valve said spring being seated on said nut; and
   a spacer on the piston rod extending through the piston from the nut to the gate valve, the length of the spacer determining the spring force acting between the gate valve and piston.

2. A hydraulic pressure unloader for connection between a pump and a hydraulic load, said unloader comprising:
   a housing defining a cylinder;
   a piston movable in said cylinder and dividing the cylinder into two chambers, an inlet chamber having a pressure inlet for connection with said pump and a bypass outlet, and an outlet chamber having a pressure outlet for connection with said hydraulic load, said piston having a passage therethrough for flow of hydraulic liquid from the inlet to the pressure outlet;
   a piston rod extending from said piston through said bypass outlet, having a bypass valve at the end thereof, movement of said piston toward the bypass outlet opening the bypass valve and movement of the piston away from the bypass outlet closing the bypass valve, the flow of liquid through the piston from the inlet to the pressure outlet establishing a pressure differential across the piston to close the bypass valve, the pressure in the outlet chamber acting on a larger piston surface than does the pressure in the inlet chamber, whereby when the pressures in the two chambers are the same, the bypass valve is opened;

a gate valve on the piston rod between the piston and the bypass valve, the piston being movable on the rod toward and away from said gate valve;

a spring urging the piston against the gate valve to close the flow passage to the piston, liquid flow from the inlet to the pressure outlet moving the piston away from the gate valve against the spring to establish the differential pressure between the inlet and outlet chambers; and a screen extending between the gate valve and the piston to trap foreign matter flowing between the inlet and the pressure outlet, there being a reverse flow through the screen when the bypass valve opens, to flush impurities therefrom.

3. The hydraulic unloader of claim 2 in which said screen is cup-shaped with a peripheral edge received in a slot in the face of said piston, outside the passage through the piston.

4. A hydraulic pressure unloader for connection between a pump and a hydraulic load, said unloader comprising:

a housing defining a cylinder:

a piston movable in said cylinder and dividing the cylinder into two chambers, an inlet chamber having a pressure inlet for connection with said pump and a bypass outlet, and an outlet chamber having a pressure outlet for connection with said hydraulic load, said piston having a passage therethrough for flow of hydraulic liquid from the inlet to the pressure outlet;

a piston rod extending from said piston through said bypass outlet, having a bypass valve at the end thereof, movement of said piston toward the bypass outlet opening the bypass valve and movement of the piston away from the bypass outlet closing the bypass valve, the flow of liquid through the piston from the inlet to the pressure outlet establishing a pressure differential across the piston to close the bypass valve, the pressure in the outlet chamber acting on a larger piston surface than does the pressure in the inlet chamber, whereby when the pressures in the two chambers are the same, the bypass valve is opened;

a gate valve on the piston rod between the piston and the bypass valve, the piston being movable on the rod toward and away from said gate valve said gate valve including a disc with an edge which seats on the face of the piston outside the passage through the piston, the gate valve having a slot in the edge to allow leakage of liquid between said chambers when the gate valve is seated; and a spring urging the piston against the gate valve to close the flow passage to the piston, liquid flow from the inlet to the pressure outlet moving the piston away from the gate valve against the spring to establish the differential pressure between the inlet and outlet chambers.

5. A hydraulic pressure unloader for connection between a pump and a hydraulic load, said unloader comprising:

a housing defining a cylinder;

a piston movable in said cylinder and dividing the cylinder into two chambers, an inlet chamber having a pressure inlet for connection with said pump and a bypass outlet with interchangeable valve seats, and an outlet chamber having a pressure outlet for connection with said hydraulic load, said piston having a passage therethrough for flow of hydraulic liquid from the inlet to the pressure outlet; and a piston rod extending from said piston through said bypass outlet, having a bypass valve at the end thereof, movement of said piston toward the bypass outlet opening the bypass valve and movement of the piston away from the bypass outlet closing the bypass valve, the flow of liquid through the piston from the inlet to the pressure outlet establishing a pressure differential across the piston to close the bypass valve, the pressure in the outlet chamber acting on a larger piston surface than does the pressure in the inlet chamber, whereby when the pressures in the two chambers are the same, the bypass valve is opened, said interchangeable valve seats having orifices of different size, selection of the valve seat establishing the bypass valve exposed to pressure in the inlet chamber to control the unloading pressure.

* * * * *